United States Patent
Hoeg et al.

(10) Patent No.: US 10,110,785 B2
(45) Date of Patent: Oct. 23, 2018

(54) DEPLOYABLE IMAGING SYSTEM EQUIPPED WITH SOLID STATE IMAGER

(75) Inventors: Hans David Hoeg, Vancouver, WA (US); Eric L. Hale, Vancouver, WA (US); Douglas S. Kirk, Ventura, CA (US); William S. Schnorr, Manhattan Beach, CA (US); Nathan Jon Schara, Washougal, WA (US)

(73) Assignee: Karl Storz Imaging, Inc., Goleta, CA (US)

( * ) Notice: Subject to any disclaimer, the term of this patent is extended or adjusted under 35 U.S.C. 154(b) by 423 days.

(21) Appl. No.: 13/572,149

(22) Filed: Aug. 10, 2012

(65) Prior Publication Data

US 2014/0046132 A1 Feb. 13, 2014

(51) Int. Cl.
*H04N 5/225* (2006.01)
*H04N 5/232* (2006.01)

(52) U.S. Cl.
CPC ......... *H04N 5/2251* (2013.01); *H04N 5/2259* (2013.01); *H04N 5/232* (2013.01)

(58) Field of Classification Search
CPC ......... A61B 1/042; A61B 1/3132; A61B 1/05; A61B 1/313; A61B 2017/00876; A61B 2017/00283; A61B 1/00158; A61B 1/34–1/73; A61B 1/041
USPC ........ 600/109, 112, 160, 164, 171, 178, 114
See application file for complete search history.

(56) References Cited

U.S. PATENT DOCUMENTS

| | | | |
|---|---|---|---|
| 5,313,306 A | 5/1994 | Kuban et al. | |
| 5,352,219 A | 10/1994 | Reddy | |
| 5,630,782 A | 5/1997 | Adair | |
| 6,663,559 B2 | 12/2003 | Hale et al. | |
| 6,853,879 B2* | 2/2005 | Sunaoshi | 700/253 |
| 6,902,528 B1 | 6/2005 | Garibaldi et al. | |
| 6,936,003 B2 | 8/2005 | Iddan | |
| 7,355,625 B1 | 4/2008 | Mochida et al. | |
| 7,429,259 B2 | 9/2008 | Cadeddu et al. | |
| 7,530,948 B2* | 5/2009 | Seibel et al. | 600/178 |
| 2003/0114731 A1 | 6/2003 | Cadeddu et al. | |
| 2003/0163029 A1 | 8/2003 | Sonnenschein et al. | |
| 2006/0195014 A1 | 8/2006 | Seibel et al. | |
| 2008/0058835 A1* | 3/2008 | Farritor | A61B 1/00158 606/130 |
| 2008/0091064 A1* | 4/2008 | Laser | 600/109 |
| 2008/0269779 A1 | 10/2008 | Cadeddu et al. | |

(Continued)

OTHER PUBLICATIONS

Extended European Search Report Application No. 13179514.8 Completed Nov. 26, 2015; dated Dec. 3, 2015 8 Pages.

(Continued)

*Primary Examiner* — Alexandra L Newton
(74) *Attorney, Agent, or Firm* — Whitmyer IP Group LLC

(57) ABSTRACT

A deployable endoscopic imaging module and endoscopic surgical system having an imaging system with solid state variable direction of view navigation features, and manipulated by direct contact force, mechanical linkage and/or magnetic force. A deployable endoscopic imaging module or endoscopic imaging system equipped with solid state variable direction of view image navigation features and software. A deployable imaging system having image navigation software and solid state variable direction of view technology which can be incorporated into a percutaneous housing for performing surgery through a patient's skin.

6 Claims, 13 Drawing Sheets

(56) References Cited

U.S. PATENT DOCUMENTS

| | | | |
|---|---|---|---|
| 2008/0312499 A1* | 12/2008 | Handa | A61B 1/0005 |
| | | | 600/109 |
| 2009/0005636 A1* | 1/2009 | Pang | A61B 1/313 |
| | | | 600/102 |
| 2009/0082627 A1* | 3/2009 | Karasawa | A61B 1/00158 |
| | | | 600/118 |
| 2009/0318758 A1 | 12/2009 | Farr et al. | |
| 2010/0010301 A1 | 1/2010 | Hale et al. | |
| 2010/0152539 A1 | 6/2010 | Ghabrial et al. | |
| 2011/0180197 A1* | 7/2011 | Akagi | A61B 1/00016 |
| | | | 156/73.1 |
| 2012/0016198 A1* | 1/2012 | Takahashi | A61B 1/00018 |
| | | | 600/109 |
| 2012/0062717 A1* | 3/2012 | Kinouchi | A61B 1/00009 |
| | | | 348/74 |

OTHER PUBLICATIONS

European Office Action Application No. 13179514.8 dated Jan. 2, 2018 8 Pages.

\* cited by examiner

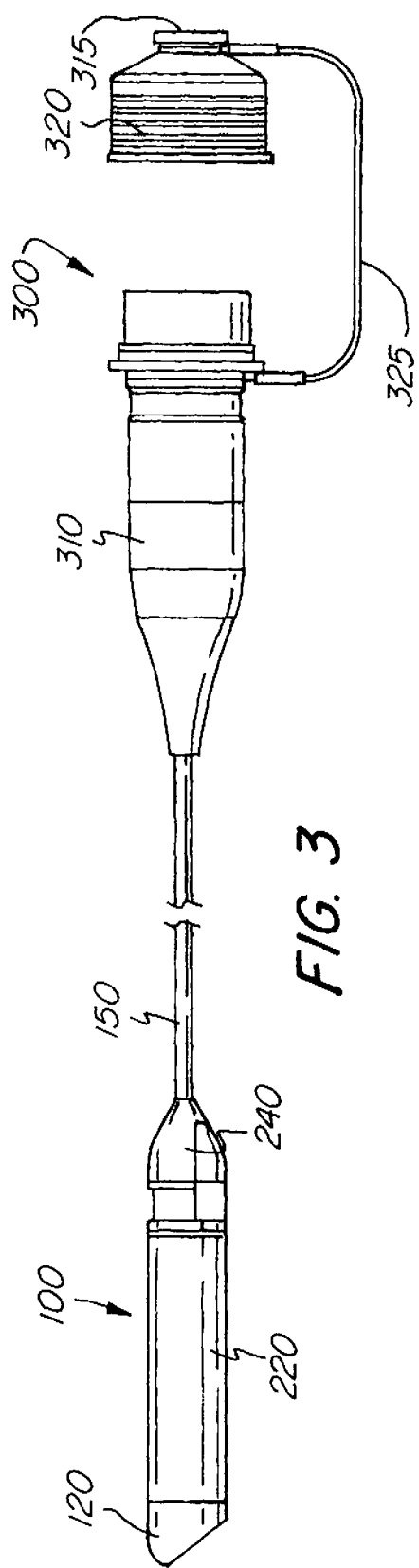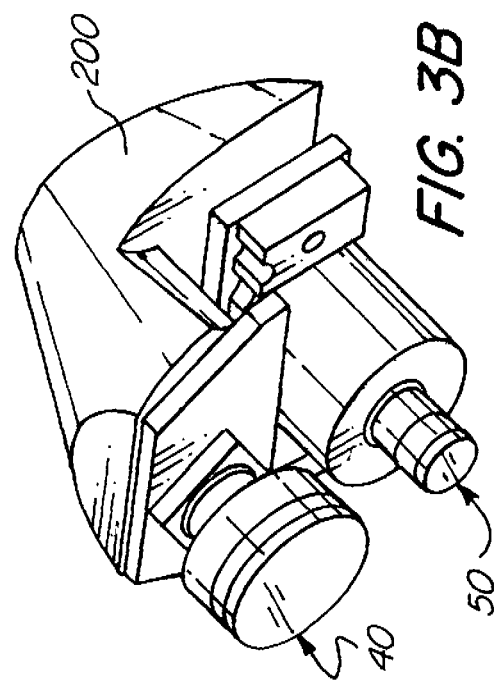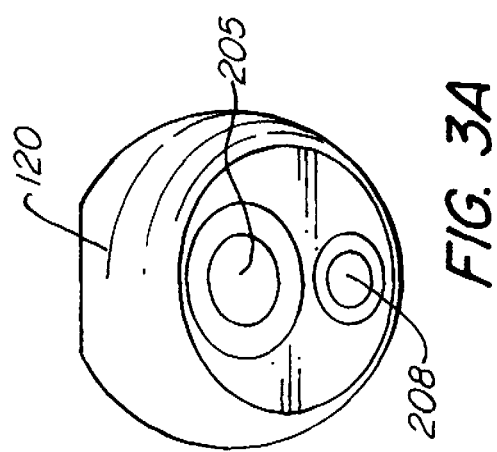

DEPLOYABLE IMAGING SYSTEM EQUIPPED WITH SOLID STATE IMAGER

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

FIELD OF THE INVENTION

The invention is directed to a deployable endoscopic imaging module (also interchangeably called a "deployable endoscopic camera") and endoscopic imaging system having a solid state variable direction of view navigation features, where the deployable endoscopic camera is manipulated by direct contact force, mechanical linkage and/or magnetic force and the solid state variable direction of view navigation features are manipulated via interaction with a computer application and/or computer program.

BACKGROUND OF THE INVENTION

Variable direction of view ("VDOV") endoscopes allow a user to change the endoscopic viewing direction without having to change the position of the endoscope itself. Such endoscopes are useful when the user wants to see structures which are beside or behind the distal tip of the endoscope, but cannot easily move a conventional endoscope shaft because of anatomical constraints or constraints imposed by other surgical instruments in the operative surgical field.

VDOV endoscopes are described in co-pending U.S. patent application Ser. No. 12/169,290 entitled "Solid State Variable Direction Of View Endoscope", filed on Jul. 8, 2008, and U.S. patent application Ser. No. 13/354,801 entitled, "Wide Angle Flexible Endoscope", filed on Jan. 20, 2012. The contents of U.S. patent application Ser. Nos. 13/354,801 and 12/169,290 are hereby incorporated into this application by reference in their entirety.

In this application, solid state variable direction of view ("SS-VDOV") technology is defined in U.S. patent application Ser. No. 12/169,290 entitled, "Solid State Variable Direction Of View Endoscope." "Deployable" may be defined as being operationally separatable from a conventional endoscope shaft and/or surgical delivery tool, able to be inserted through a patient's skin and into a patient's body, and in communication with a camera control unit ("CCU") and/or in communication with an interface module.

Endoscopic surgical systems using VDOV endoscopes are desirable because such systems afford surgeons greater flexibility in their procedural approach. Such systems include: U.S. Pat. No. 7,355,625 Mochida et al; U.S. Pat. No. 6,936,003 Iddan; U.S. Pat. No. 6,902,528 Garibaldi et al.; U.S. Pat. No. 5,630,782 Adair; U.S. Patent Publication No. 2010/0152539 A1 Ghabrial et al.; and U.S. Patent Publication No. 2009/0318758 A1 Farr et al.

None of these prior art references teach a deployable endoscopic imaging module or endoscopic imaging system that may be manipulated through direct contact force, mechanical linkage and/or magnetic force. Furthermore, none of these prior art references teach a deployable endoscopic imaging module or endoscopic imaging system equipped with SS-VDOV image navigation features and software.

Furthermore, none of the prior art references teach a deployable endoscopic imaging module having image navigation software and SS-VDOV technology that can be incorporated into a housing sleeve for performing surgery through a patient's skin.

Thus, it is desirable to provide a deployable endoscopic imaging module or endoscopic imaging system that may be manipulated through direct contact force, mechanical linkage and/or magnetic force. It is also desirable to provide a deployable endoscopic imaging module or endoscopic imaging system equipped with SS-VDOV image navigation features and software.

It is further desirable to provide a deployable endoscopic imaging system having image navigation software and solid SS-VDOV technology that can be incorporated into a housing sleeve for performing surgery through a patient's skin.

SUMMARY OF THE INVENTION

Accordingly, it is an object of the invention to provide a deployable endoscopic imaging module or a deployable endoscopic imaging system that may be manipulated through direct contact force, mechanical linkage and/or magnetic force. It is another object of the invention to provide a deployable endoscopic imaging module or a deployable endoscopic imaging system equipped with SS-VDOV image navigation features and software.

It is another object of the present invention to provide a deployable endoscopic imaging module having image navigation software and SS-VDOV technology that can be incorporated into a housing sleeve for performing surgery through a patient's skin.

These objects of the invention are achieved by providing an endoscopic imaging system comprising: a deployable endoscopic imaging module including a housing; a wide-angle lens disposed in the housing; a solid state imager disposed in the housing; a light source disposed in the housing; and a camera control unit in communication with the deployable endoscopic imaging module, wherein the camera control unit includes image navigation software in communication with the solid state imager.

In certain embodiments, the housing comprises a proximal end and a distal end, and a longitudinal axis spanning the proximal end and the distal end. In certain embodiments, the housing comprises various shapes and may be cylindrical, ball shaped, square shaped or cone shaped.

In certain embodiments, the housing may be composed of multiple parts, such that the wide-angle lens is disposed in the first part of the housing, the solid state imager is disposed in the second part and the light source is disposed in a third part of the housing. In certain embodiments, the housing may have more or less than three parts and combinations of the wide-angle lens, solid state imager and light source may be disposed in these parts of the housing.

In certain embodiments, the parts of the housing may be connected to each other via various means, such as by magnets, mechanical means, a lead line or cord, or via pins.

In certain embodiments, endoscopic imaging system further comprises a positioning element in communication with the imaging module, the positioning element maintaining the position of the imaging module.

In certain embodiments, the camera control unit is external from the imaging module. In certain embodiments, the camera control unit may be part of a display, a computer, or an input device.

In certain embodiments, the positioning element is external from the imaging module. In certain embodiments, the positioning element is a magnet. In certain embodiments, the positioning element is a pin or other such element that is able to pass through the skin. In certain embodiments, the positioning element is connected to the deployable imaging module. In certain embodiments, the positioning element uses various types of force to hold the endoscope in place.

In certain embodiments, the endoscopic imaging system further comprises a trocar. In certain embodiments, the housing of the deployable endoscopic imaging module passes through a trocar.

In certain embodiments, the endoscopic imaging system further comprises a tool element. In certain embodiments, the tool element can pass through the skin and to allow a surgeon to operate on a surgical area.

In certain embodiments, the housing may have an approximate diameter of less than 15 mm. In certain embodiments, the housing may be a sleeve. The solid state imager may capture a field of view. The solid state imager may be a CMOS sensor or a CCD sensor.

In certain embodiments, the deployable endoscopic imaging system further comprises an input device that allows a user to select a portion of said field of view corresponding to a region of interest of said field of view. The input device may be a button, joystick, touchpad, touch screen, foot pedal, gesture detection, and/or voice control.

The deployable endoscopic imaging module may be manipulated through direct contact force, mechanical linkage, and/or magnetic force.

In certain embodiments, the deployable endoscopic imaging module may be coupled to an interface module via a coupling mechanism. The coupling may be done after the deployable endoscopic imaging module is deployed or inserted through a patient's skin and further deployed or inserted into a patient's body. The coupling mechanism may include various methods and/or techniques to couple the deployable endoscopic imaging module to the interface module.

In certain embodiments, the deployable endoscopic imaging module may be positioned or deployed within a patient's body before it is coupled to the interface module.

In certain embodiments, the camera control unit may have video/image capture features, and may provide a light source output, the light source output being coupled to the deployable endoscopic imaging module.

In certain embodiments, a light source may be disposed in the interface module and the light source output may be coupled to the deployable endoscopic imaging module.

In certain embodiments, the interface module is integral to a trocar and/or cannula.

In certain embodiments, the coupling mechanism is able to decouple the deployable endoscopic imaging module from the interface module. Decoupling is important because during a surgical procedure the deployable endoscopic imaging module may need to remain inside the patient's body while the interface module is decoupled and removed from the sterile surgical field.

In certain embodiments, housing may have an approximate diameter of less than 15 mm. Preferably, the housing diameter is approximately between 8-12 mm.

In certain embodiments, the interface module may also be capable of deployment or insertion through a patient's skin. In certain embodiments, the housing is a percutaneous housing.

Other objects of the invention are achieved by providing an endoscopic imaging system comprising: a deployable endoscopic imaging module, including a solid state imager and a wide-angle lens, wherein the deployable endoscopic imaging module outputs image data corresponding to a field of view; a light source, to illuminate the field of view; a surgical display; and a camera control unit, in communication with the deployable endoscopic imaging module, the camera control unit including a computer having software to process the image data into a format compatible with the surgical display.

Other objects of the invention are achieved by providing an endoscopic imaging system comprising: a endoscopic imaging module including an electronic imaging system, the endoscopic imaging module being manipulated through direct contact force; a light source; an interface module; a coupling mechanism to couple the deployable endoscopic imaging module to the interface module; a display; and a computer having software to process the images from the electronic imaging system.

In certain embodiments, the interface module may have a control mechanism or control means. The interface module may include a light source or may include additional control means. In certain embodiments the endoscopic imaging module is deployable.

In certain embodiments, the interface module is integral to a trocar and/or a cannula.

In certain embodiments, the deployable endoscopic imaging module is further manipulated through mechanical linkage.

In certain embodiments, the deployable endoscopic imaging module includes a wide-angle lens and a solid state imager.

In certain embodiments, the solid state imager captures a field of view.

In certain embodiments, the deployable endoscopic imaging module includes a high definition (HD) sensor.

In certain embodiments, the endoscopic imaging system further comprises an input device that allows a user to select a portion of said field of view corresponding to a region of interest of said field of view. The input device may be a button, joystick, touchpad, touchscreen, foot pedal, gesture detection, and/or voice control.

In certain embodiments, the housing may have an approximate diameter of less than 15 mm. Preferably, the housing diameter is between 8-12 mm.

Other objects of the invention are achieved by providing an endoscopic surgical system comprising: a deployable endoscopic imaging module having an electronic imaging system, the deployable endoscopic imaging module being manipulated through magnetic forces; an interface module; a coupling mechanism to couple the deployable endoscopic imaging module to the interface module; a light source; a display to display images from the electronic imaging system; and a computer, the computer including software to process the images from the electronic imaging system.

In certain embodiments, the electronic imaging system may be a deployable imaging system.

In certain embodiments, the electronic imaging system includes a wide-angle lens and a solid state imager. In certain embodiments, the solid state imager captures a field of view. In certain embodiments, the electronic imaging system includes an HD (high definition) sensor.

In certain embodiments, the endoscopic imaging system further comprises an input device that allows a user to select a portion of said field of view corresponding to a region of interest of said field of view. The input device may include, but is not limited to a button, joystick, touchpad, touchscreen, foot pedal, gesture detection, and/or voice control.

In certain embodiments, the interface module may be deployable through a patient's skin. In certain embodiments, the endoscopic imaging system may be deployable or insertable through a patient's skin and further deployable or insertable into a patient's body.

In certain embodiments, the interface module is integral to a trocar and/or a cannula.

In certain embodiments, the endoscopic surgical system further comprises a graphical user interface ("GUI") that appears on the display.

Other objects of the invention are achieved by providing a method of using a deployable endoscopic system comprising: providing a deployable endoscopic imaging module having an electronic imaging system, the deployable endoscopic imaging module being manipulated through direct contact force; providing an interface module, providing a coupling mechanism to couple the deployable endoscopic imaging module to the interface module; providing a light source; providing a display; and providing a computer having software to process the images from the electronic imaging system; inserting the deployable endoscopic imaging module through an incision or naturally occurring opening in a patient's skin; and coupling the deployable endoscopic imaging module to the interface module via the coupling mechanism.

Other objects of the invention are achieved by providing a deployable endoscopic imaging module comprising: a housing comprising a proximal end and a distal end and a longitudinal axis spanning the proximal end and the distal end; a wide-angle lens disposed in the distal end of the housing; a solid state imager disposed in the distal end of the housing; and image navigation software in communication with the solid state imager, wherein the deployable endoscopic imaging module is adapted to being connected after being deployed.

Other embodiments of the invention include an endoscopic imaging system comprising a deployable endoscopic imaging module containing an electronic imager which can capture a field of view, inserted into a patient's body through an incision or naturally occurring opening in a patient's skin; a coupling mechanism which allows the deployable endoscopic imaging module to be coupled to an interface module and which allows for decoupling of said deployable endoscopic imaging module and said interface module; a light source; SS-VDOV software; an input device which allows a user to select a portion of the field of view corresponding to a region of interest on the solid state imager; and a display for showing the field of view and/or the portion of the field of view.

Other objects of the invention are achieved by providing an endoscopic imaging system comprising: a deployable imaging module having a lens, an imager and a light source; a camera control unit in communication with the imaging module, the camera control unit having image navigation software in communication with the imager; and a positioning element in communication with the imaging module, the positioning element maintaining the position of the imaging module.

In certain embodiments, the camera control unit is external from the imaging module. In certain embodiments, the positioning element is external from the imaging module. In certain embodiments, the positioning element is a magnet. In certain embodiments, the lens is a wide-angle lens. In certain embodiments, the imager is a solid state imager.

Other objects of the invention and its particular features and advantages will become more apparent from consideration of the following drawings and accompanying detailed description. It should be understood that the detailed description and specific examples, while indicating the preferred embodiment of the invention, are intended for purposes of illustration only and are not intended to limit the scope of the invention.

BRIEF DESCRIPTION OF THE DRAWINGS

FIG. 3 is side view of the embodiment of FIG. 1 in combination with a second module of an embodiment of the invention;

FIG. 3A is a view of the front camera head module of the endoscope of FIG. 1;

FIG. 3B is a perspective view of a camera, including front camera head module and rear magnets of an embodiment of the present invention;

DETAILED DESCRIPTION OF THE INVENTION

The following detailed description illustrates the invention by way of example, not by way of limitation of the principles of the invention. This description will enable one skilled in the art to make and use the invention, and describes several embodiments, adaptations, variations, alternatives and uses of the invention, including what is presently believed to be the best mode of carrying out the invention.

The present invention is directed to a novel, unique and improved deployable endoscopic imaging module and endoscopic imaging system having image navigation software and SS-VDOV technology features, wherein the deployable endoscopic imaging module is manipulated through direct contact force, mechanical linkage and/or magnetic force.

The present invention provides a deployable endoscopic imaging module or endoscopic imaging system equipped with SS-VDOV image navigation features and software.

Figure 1:
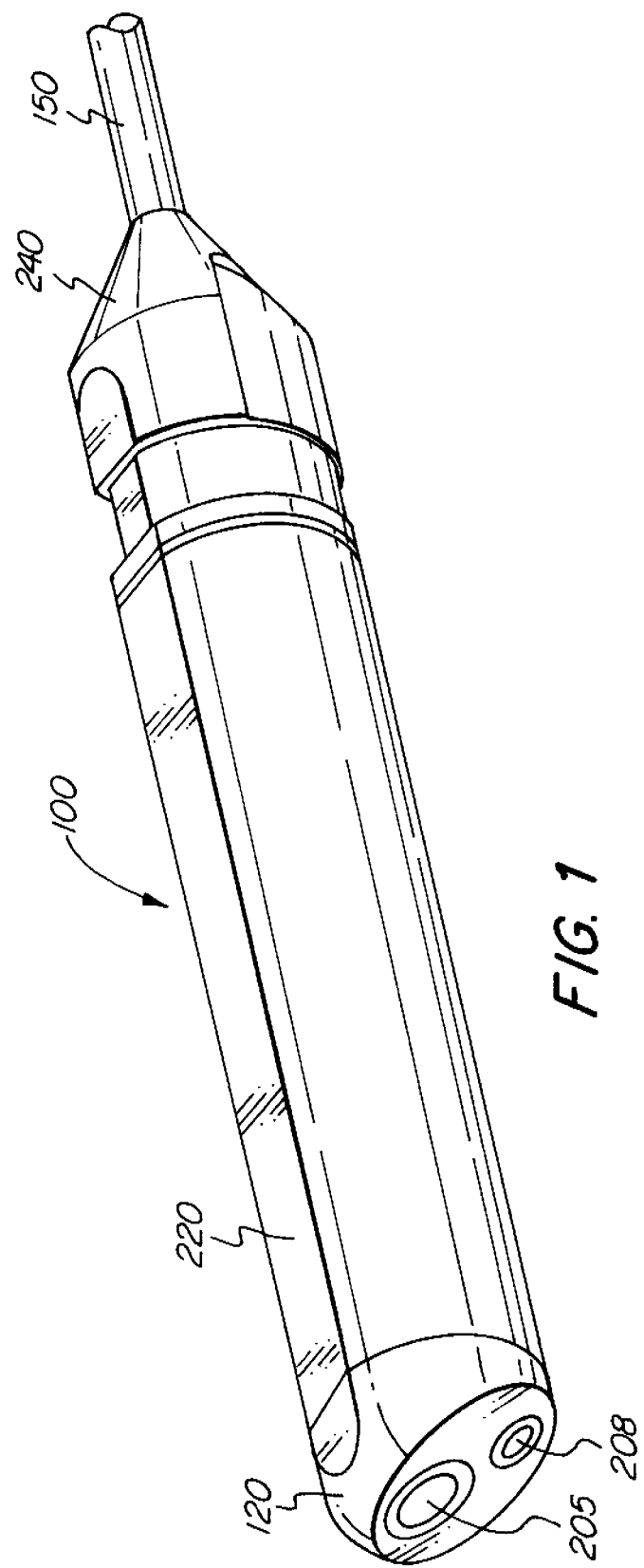
FIG. 1 is a perspective view of an endoscope of the present invention.
Figure 2:
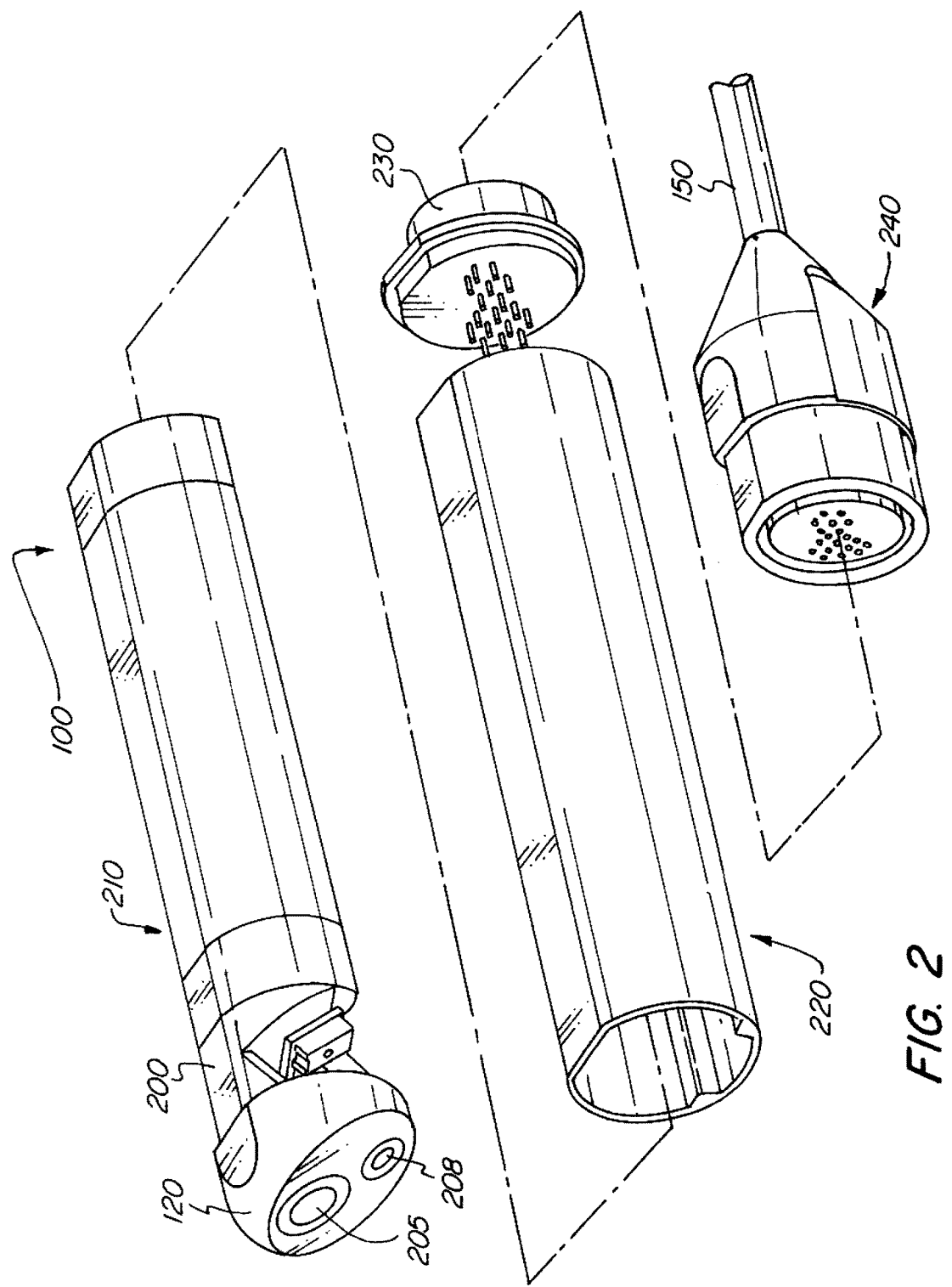
FIG. 2 is an exploded view of FIG. 1.

FIGS. 1-2 depict a deployable endoscopic imaging module 100 of an embodiment of the present invention. FIG. 1 depicts endoscopic imaging module 100 having a housing 210 covered by hermetic sleeve 220 with a distal tip/end 120 and a proximal end 240. The housing 210 has a longitudinal axis extending from the proximal end 240 to the distal end 120 of the deployable endoscopic imaging module 100. The distal tip 120 has a camera, sensor, and/or imager disposed within the distal tip 120. In one embodiment, cable 150 is shown and provides power and control to, and receives imaging and control data from, the deployable endoscopic imaging module 100. The distal end 120 has illumination lens cover 205 and imager lens cover 208 allowing for the distal end 120 to be a hermetically sealed window assembly.

FIG. 2 shows an exploded view of FIG. 1. Here, housing 210 of the deployable endoscopic imaging module 100 is shown having a distal tip/end 120 with distal illumination and imaging mount 200. Illumination and imaging mount 200, illumination lens cover 205, and imager lens cover 208 support an imager and wide angle lens/optics 50 (FIGS. 3B, 4, and 6), solid state imager 360 (FIG. 4), within the distal end 120 of deployable endoscopic imaging module 100.

In certain embodiments, the illumination and imaging mount 200 is equipped with electronics that support image navigation software.

FIG. 2 also shows hermetic sleeve 220, which covers and protects the housing 210 and the internal components within the deployable endoscopic imaging module 100. Also shown is hermetic bulkhead 230 and cable strain relief 240, which provide electrical connections for the deployable endoscopic imaging module 100. Thus, the distal tip 120, the hermetic sleeve 220, and the hermetic bulkhead 230 form a complete hermetic barrier to protect the housing 210 and the internal components from operational environments (i.e. within a patient's body) and from harsh environments such as during autoclave sterilization. An interconnect cable 150 is also shown at the proximal end of deployable endoscopic imaging module 100.

FIG. 3 is a side view of FIG. 1 in combination with the interface module 300. FIG. 3 also depicts the interface module 300 with a cable strain relief 310, a protective cap 320, a protective cap leash 325, and a leash swivel 315.

FIG. 3A is a view of the front of the distal tip 120 of the deployable endoscopic imaging module 100 of FIG. 1. Here, illumination lens cover 208 and imaging lens cover 205 are shown, which allow viewing of the surgical area. The distal tip 120 may enclose objective imaging optics including aperture and sapphire cover windows, LEDs with concentrator lenses and sapphire cover windows, LEDs and imaging electronics and copper heat sinks which may be affixed to the illumination and imaging mount 200.

FIG. 3B is a perspective view of the illumination and imaging mount 200. The illumination and imaging mount 200 may include an imager assembly 50, and an illuminator assembly 40.

Figure 4:
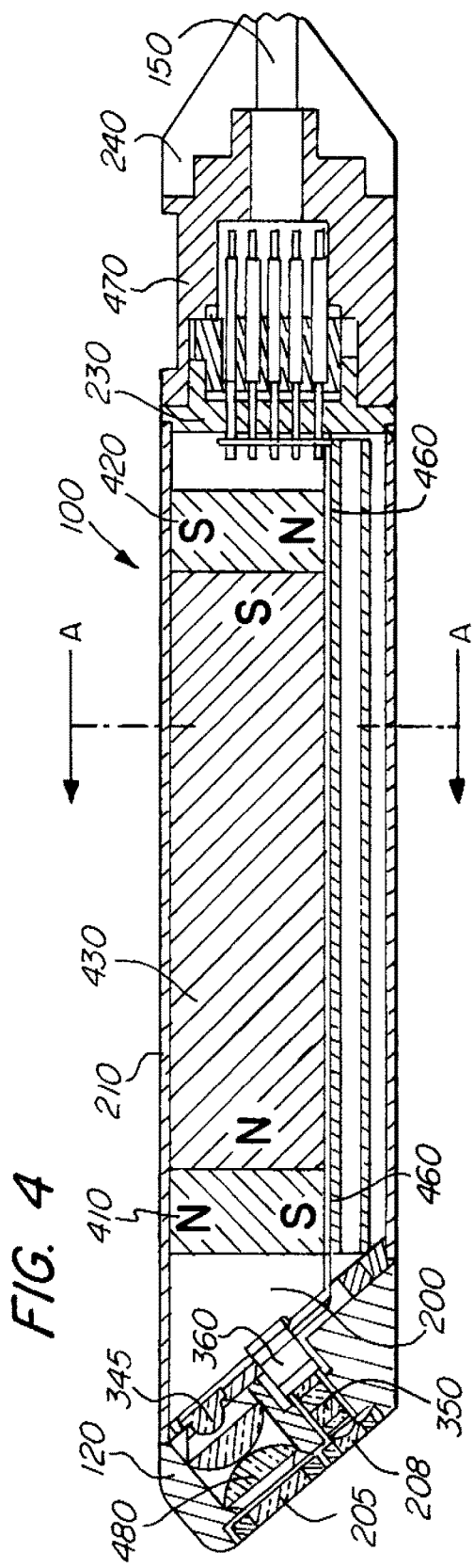
FIG. 4 is a detailed side view of the internal components of the endoscope of FIG. 1.

FIG. 4 is a detailed side view of the internal components of the deployable endoscopic imaging module 100 shown in FIG. 1. FIG. 4 shows magnets 410, 420 and 430 disposed within the housing 210. The polar orientation of the magnets 410, 420 and 430 are shown with the N-S designation. Also shown is the interconnect subassembly 470. The interconnect subassembly 470 includes the hermetic bulkhead 230.

In distal end 120 of deployable endoscopic imaging module 100, the illumination and imaging components are shown in FIG. 4. Here, an LED illuminator 345 and a solid state imager 360 are shown, with illumination lens cover 205 and imaging lens cover 208 covering each lens respectively to form a sealed window assembly. In certain embodiments, the illuminator assembly 40 may include a wide-angle lens or lenses 480, and the imaging assembly 50 may include a wide-angle lens or lenses 350.

The components disposed within distal end 120 may include a ⅛" CCD sensor, a white light LED, a temperature sensor, an IDROM (identification read only memory), an I2C bus, and video and timing interface electronics.

The mechanical elements disposed within the distal end 120 may include a wire harness 460.

The deployable endoscopic imaging module 100 is intended to survive a minimum of 200 autoclave sterilization cycles using an included sterilization carrier. The carrier is also intended to reduce the unintended magnetic attraction of metal objects in an Operating Room (OR) or in reprocessing areas. The interface module 300 is intended to interface with a specialized Video Endoscope Adapter ("VEA") distal connector 1210 (FIG. 12), which provides a power/current source for LED illumination, which may be internal to the deployable endoscopic imaging module 100.

Figure 5:
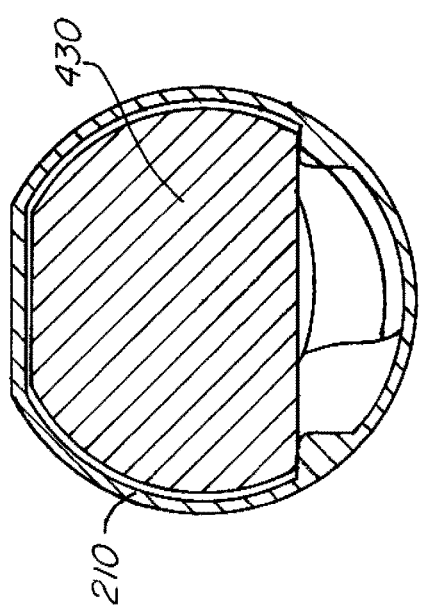
FIG. 5 is a cut-out view of along A-A in FIG. 4.

FIG. 5 is a cut-out view of along A-A in FIG. 4. FIG. 5 shows a magnet 430 disposed within the hermetic sleeve 220.

Figure 6:
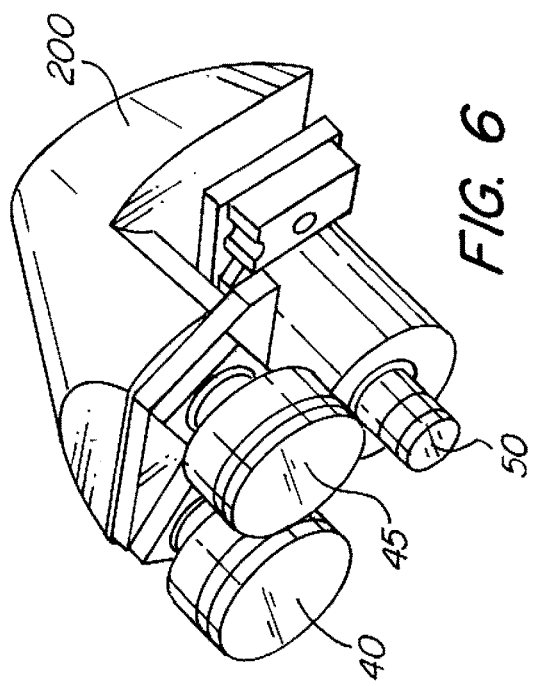
FIG. 6 is a perspective view of a camera, including camera head module of an embodiment of the present invention.

FIG. 6 is a perspective view of the illumination and imaging mount 200. FIG. 6 is similar to FIG. 3, except that it depicts two illuminator assemblies 40 and 45. Having an illumination and imaging mount 200 with two illuminator assemblies requires two illumination lens covers 205 disposed in distal tip 120.

Figure 10:
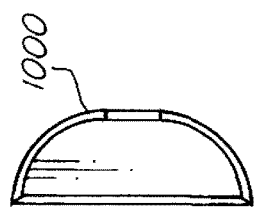
FIGS. 7-11 are side views of the various magnets that are used in embodiments of the invention.
Figure 11:
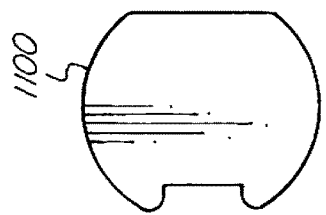
Figure 9:
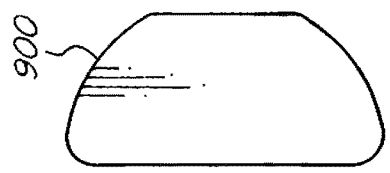
Figure 7:
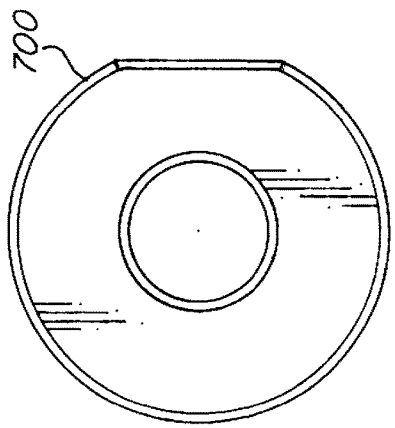
Figure 8:
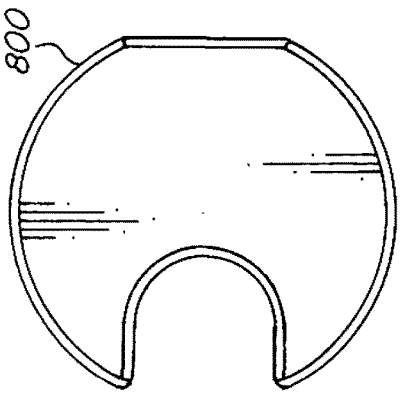

FIGS. 7-11 are side views of the various magnets that may be used in embodiments of the invention, such as magnets 410, 420 and 430 in FIG. 4. FIG. 7 shows magnet 700, FIG. 8 shows magnet 800, FIG. 9 shows magnet 900, FIG. 10 shows magnet 1000, and FIG. 11 shows magnet 1100. The magnets may vary in magnetic strength, distance, shape and size in an attempt to optimize available magnetic force.

At 30.1 mm distance, the magnet 700 is a 1.81 lb magnet, magnet 800 is a 1.86 lb magnet, magnet 900 is a 1.0 lb magnet, magnet 1000 is a 0.49 lb magnet and magnet 1100 is a 0.94 lb magnet. Magnets 700 and 800 may have approximately a 14 mm diameter, while magnets 900, 1000 and 1100 may have approximately a 10 mm diameter.

Figure 12:
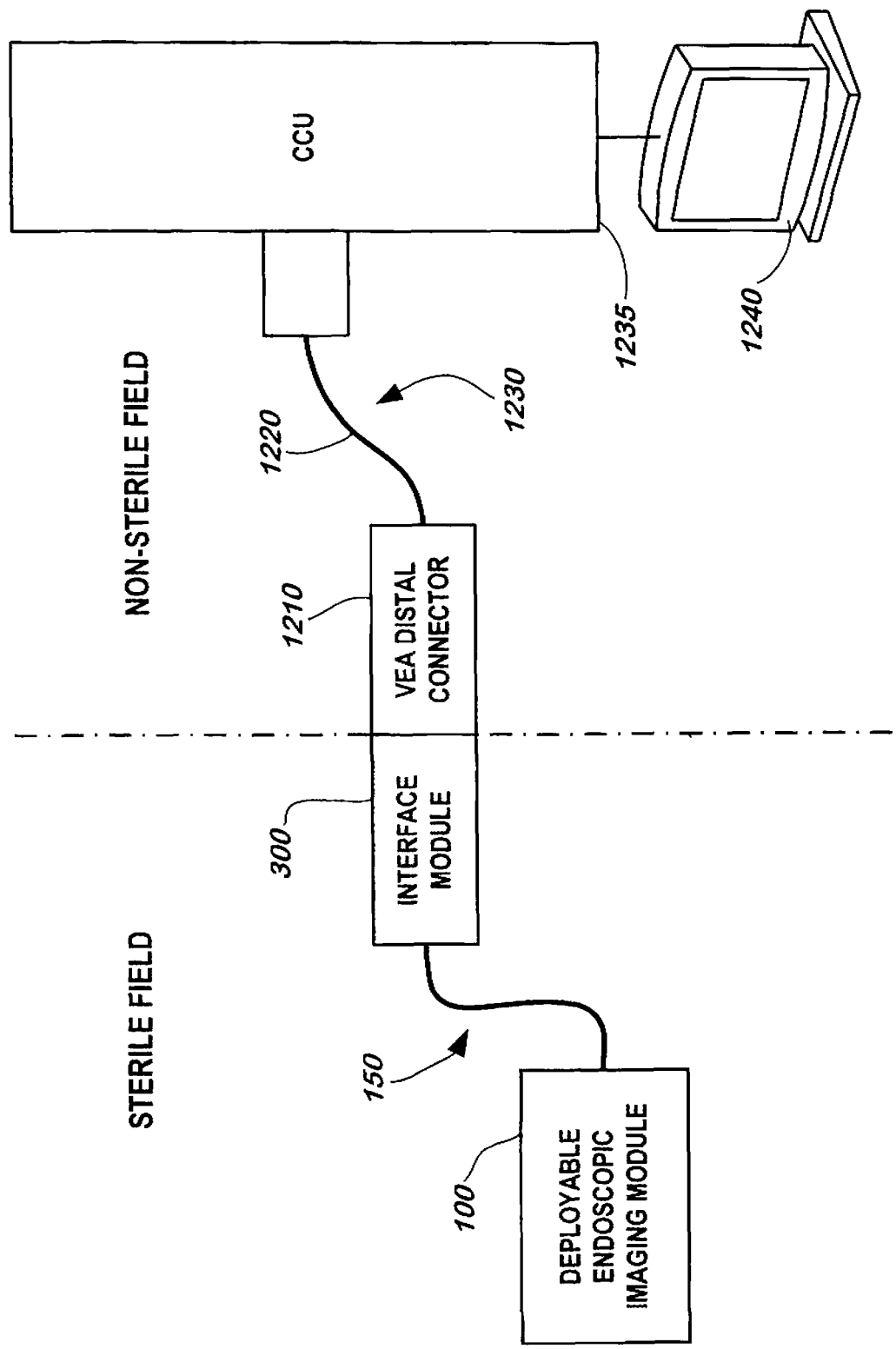
FIG. 12 is a block view of the endoscopic imaging system of an embodiment of the present invention.

FIG. 12 is a block view of the endoscopic imaging system of an embodiment of the present invention. FIG. 12 shows that the endoscopic imaging module 100 is located within a sterile field and connected via the cable 150 to the interface module 300. The interface module 300 is connected to the VEA distal connector 1210, which is connected via a cable 1220 to a VEA 1230. The VEA 1230 provides communication between a camera control unit ("CCU") 1235 and the endoscopic imaging module 100. The CCU 1235 receives image data from the endoscopic imaging module 100 and processes the image data into a usable format for display on surgical display 1240.

The VEA 1230 and CCU 1235 are located outside the sterile field and therefore do not require sterilization. The surgical display 1240 may or may not be in the sterile field depending upon the surgical procedure being performed and the OR equipment configuration.

Figure 13:
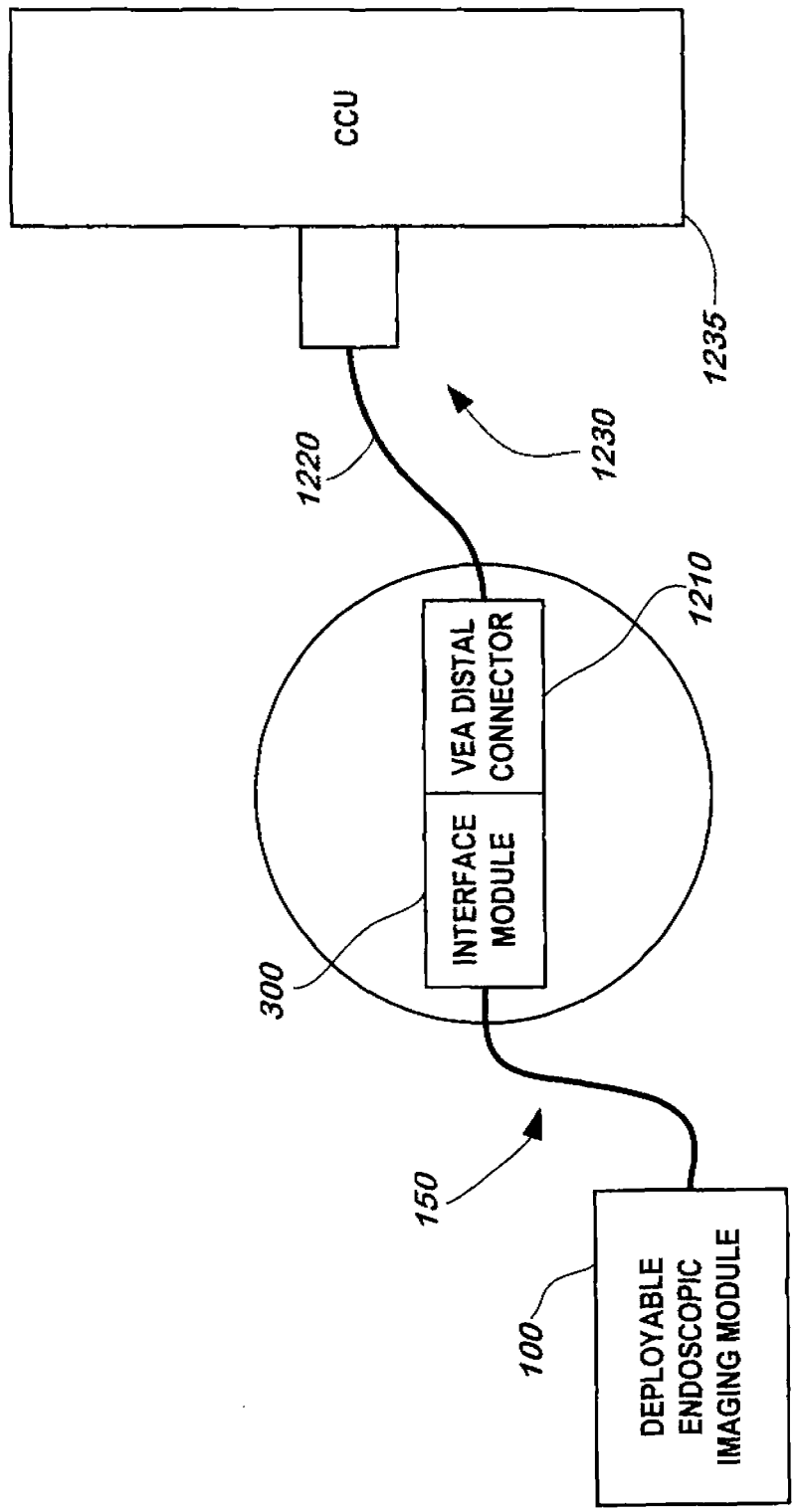
FIG. 13 is a block view of the endoscopic imaging system of an embodiment of the present invention.

FIG. 13 is block view of the endoscopic imaging system of an embodiment of the present invention. FIG. 13 shows endoscopic imaging module 100 connected via a cable 150 to an interface module 300. The interface module is connected to a VEA distal connector 1210, which is connected via a cable 1220 to a VEA 1230. The VEA 1230 provides communication between the CCU 1235 and the endoscopic imaging module 100. The CCU 1235 receives image data from the endoscopic imaging module 100 and processes the image data into a usable format for display on the surgical display 1240. In certain embodiments, the endoscopic imaging module 100 may be in wireless communication with the CCU 1235.

In certain embodiments, the electronics in the deployable endoscopic imaging module 100 provide an interface to a CCD sensor, an IDROM, and a temperature sensor. The temperature sensor may be capable of a 0.2° C. minimum accuracy over a 10° C. to 70° C. operational temperature range.

In certain embodiments, the electronics in the deployable endoscopic imaging module 100 may provide an interface to the LED. The electronics including interface hardware (i.e. cables and connectors) may support a current of up to 500 mA (3.5 V max LED voltage). The endoscopic imaging module 100 may include a nonvolatile memory.

Figure 14:
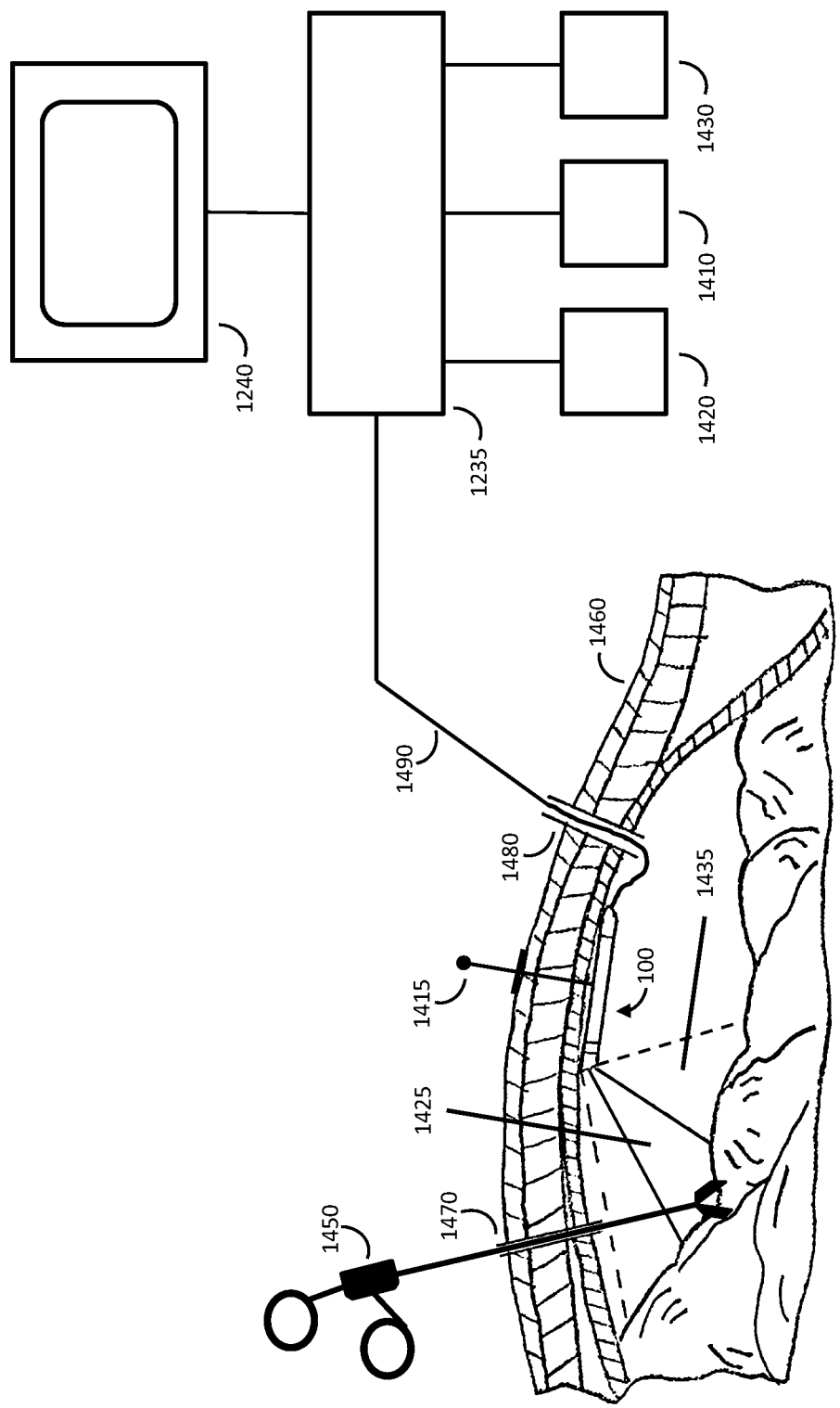
FIG. 14 is a view of an endoscope of the present invention being deployed in a patient.
Figure 15:
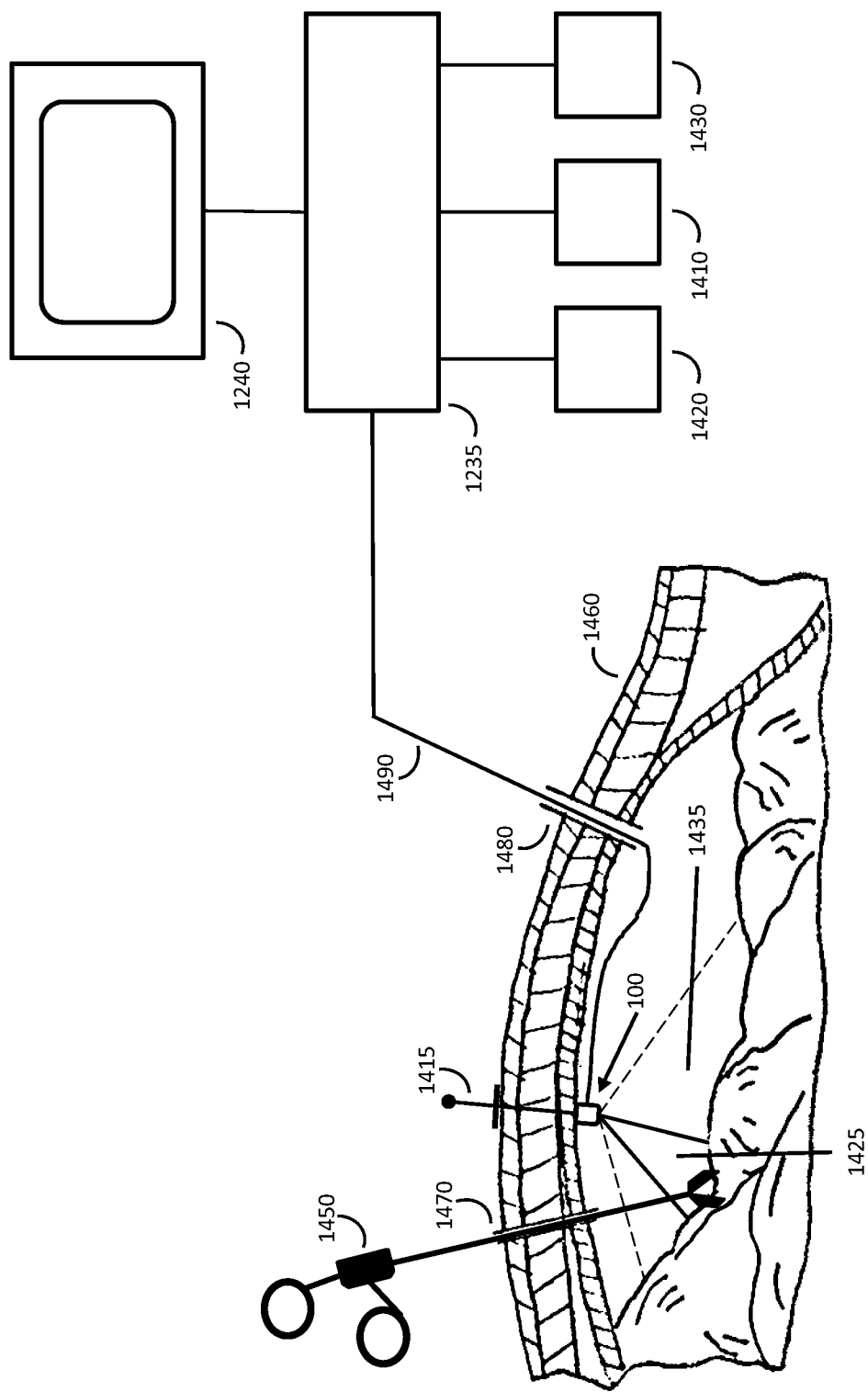
FIG. 15 is a view of an endoscope of the present invention being deployed in a patient.
Figure 16:
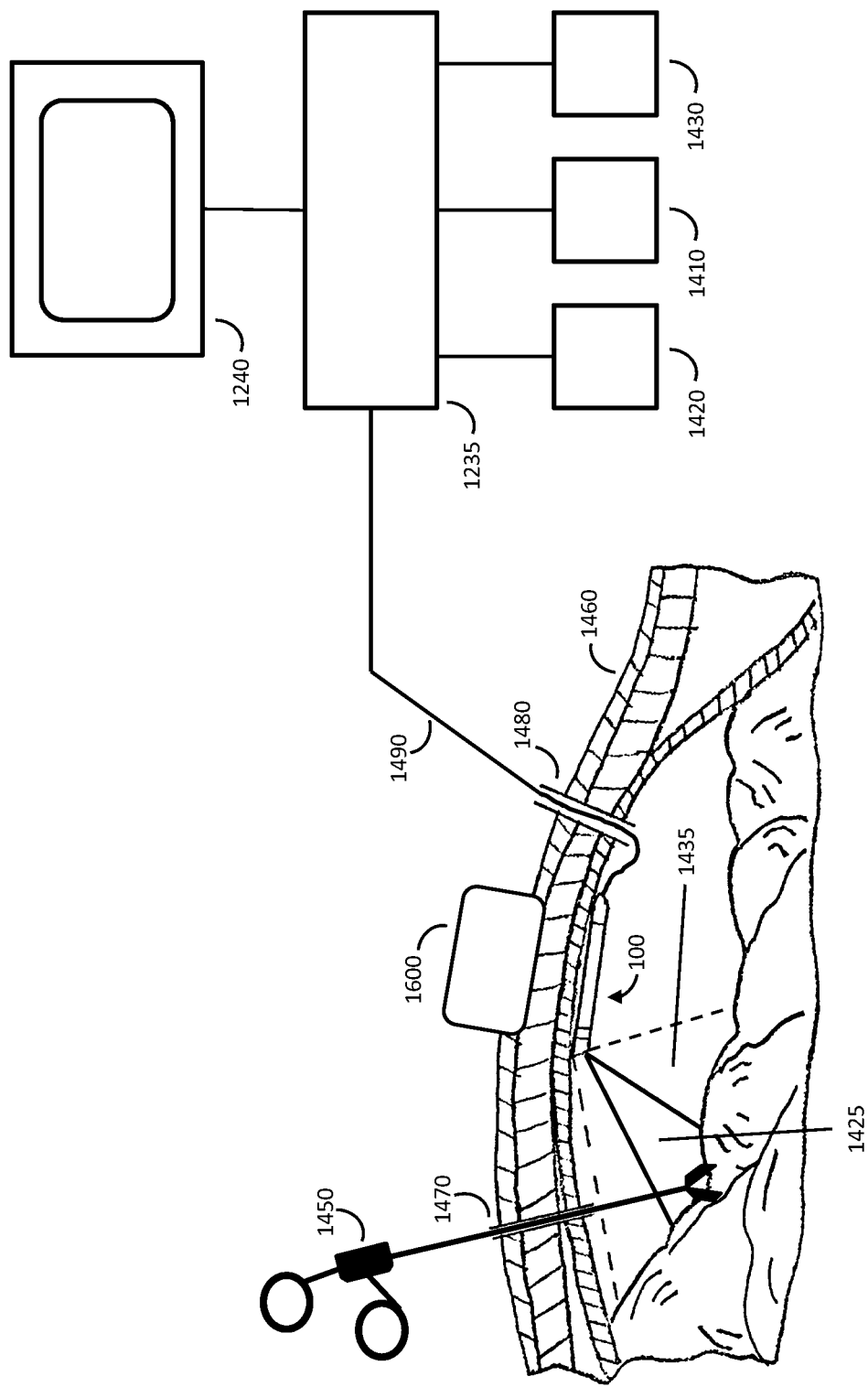
FIG. 16 is a view of an endoscope of the present invention being deployed in a patient

FIG. 14 shows a view of the endoscopic imaging system of an embodiment of the invention where the endoscopic imaging module 100 is shown inserted (i.e. in vivo/in situ) through the skin 1460 of a patient. In FIG. 14, the endoscopic imaging module 100 is shown being able to pass through trocar 1480, which has an inner diameter of approximately less than 15 mm. The endoscopic imaging module 100 is shown connected via cable 1490 to a CCU 1235, which may be controlled by one or more input devices, including, but not limited to a keypad 1420, a joystick 1410, a foot pedal 1430, a button, a touchpad, a touchscreen, gesture detection, and/or voice control (not shown). These types of input devices may control the SS-VDOV view vectors of the deployable endoscopic imaging module 100. The CCU 1235 outputs processed image data for presentation on the surgical display 1240. An endoscopic surgical instrument 1450 may be used by insertion through the patient's skin 1460 and into the abdominal cavity for therapeutic intervention within the endoscopic imaging module's 100 selected field of view 1425. The dashed lines of FIGS. 14, 15, and 16 represent the field of view 1435 captured by the image sensor 360.

Furthermore, FIG. 14 shows a surgical instrument 1450 passing through a second incision 1470.

In certain embodiments, the endoscopic imaging system is a percutaneous deployable imaging system with SS-VDOV navigation features. This is useful because a deployable imaging system allows surgery with fewer incisions than conventional endoscopy. Poking thin (less than approximately 3 mm diameter) rods, pins, and/or needles 1415 through a patient's skin to secure the deployable endoscopic imaging module 100 to the inner abdominal wall, or other cavities within the patient, is nearly atraumatic and does not leave scars. An in-vivo/in-situ deployable imaging system with a percutaneous housing sleeve affords the reduced trauma and cosmesis of needle endoscopy while at the same time providing image quality at least on par with traditional (non-VDOV and/or non-SS-VDOV) endoscopy.

SS-VDOV navigation features are useful for a deployable/percutaneous imaging system, especially because there are additional mobility constraints with needle endoscopy. For example, too much maneuvering of a deployable endoscopic imaging module 100 (thus stretching/tearing/loading/abrading the needle entry hole) invalidates the atraumatic and cosmesis advantages of a very small incision/skin puncture.

SS-VDOV navigation features brings added benefit for an endoscopic imaging system because the endoscopic imaging module 100 is secured to the ceiling/wall of the abdominal cavity and therefore in most cases has even less mobility than with conventional hand-held endoscopes. However, the SS-VDOV navigation features compensate for most, if not all, of this reduced mobility.

In certain embodiments, the hermetic bulkhead subassembly may contain the electro-optical components and magnets. The subassembly may be sealed against moisture penetration from steam autoclave sterilization processes. The endoscopic imaging module 100 may include measures and/or processes to minimize internal fogging after hermetic sealing and over the life of the product. The design may have a maximum leak rate of $10^{-7}$ atm*cc/sec. This protects the magnets and electronics from damage due to harsh or less than ideal environmental conditions.

In certain embodiments, the device focus may be fixed (non-adjustable). The position of the imager lens with respect to the imager plane may be determined during an active focus adjustment. The imager lens may be positioned to achieve the optical focus balance between each of the 4 field positions (50% diagonal) at an object distance of approximately 75 mm.

In certain embodiments, the endoscopic imaging module 100 and endoscopic imaging system may be used for laparoscopic surgery. The endoscopic imaging module 100 and endoscopic imaging system avoids many of the difficulties generally associated with conventional laparoscopic surgery by providing a modular imaging system which enables an instrument to be externally manipulated by a surgeon close to, or adjacent to, the area where the endoscopic imaging module 100 is to be used.

The need for long instrument shafts, which, in conventional laparoscopic procedures, must span the distance from the nearest trocar port to the target surgical area, is avoided. The use of deployable endoscopic imaging modules of the embodiments of the present invention enhances the advantages and broadens the applicability of laparoscopic surgical procedures when compared to traditional laparotomy.

FIG. 15 shows an embodiment of the present invention in which the endoscopic imaging module 100 is adapted to be deployed centric to the surgical area. The endoscopic imaging module 100 may be adapted to be deployed centric to a surgical area, wherein the illumination assembly 40 and imager assembly 50 are deposited at the bottom of the endoscopic imaging module 100. The endoscopic imaging module's 100 selected field of view 1425 and image sensor field of view 1435 are depicted. Also shown are thin (less than approximately 3 mm diameter) rods, pins, and/or needles 1415 through a patient's skin to secure the endoscopic imaging module 100 to the inner abdominal wall, or other cavities within the patient, is nearly atraumatic and does not leave scars. Also shown are endoscopic surgical instrument 1450, cable 1490, and CCU 1235, which may be controlled by one or more input devices, including, but not limited to a keypad 1420, a joystick 1410, a foot pedal 1430, a button, a touchpad, a touchscreen, gesture detection, and/or voice control (not shown).

FIG. 16 shows an embodiment of the present invention wherein the deployable endoscopic imaging module 100 is attached to a patient's inner abdominal wall and manipulated via an external surgical magnet 1600.

Figure 17:
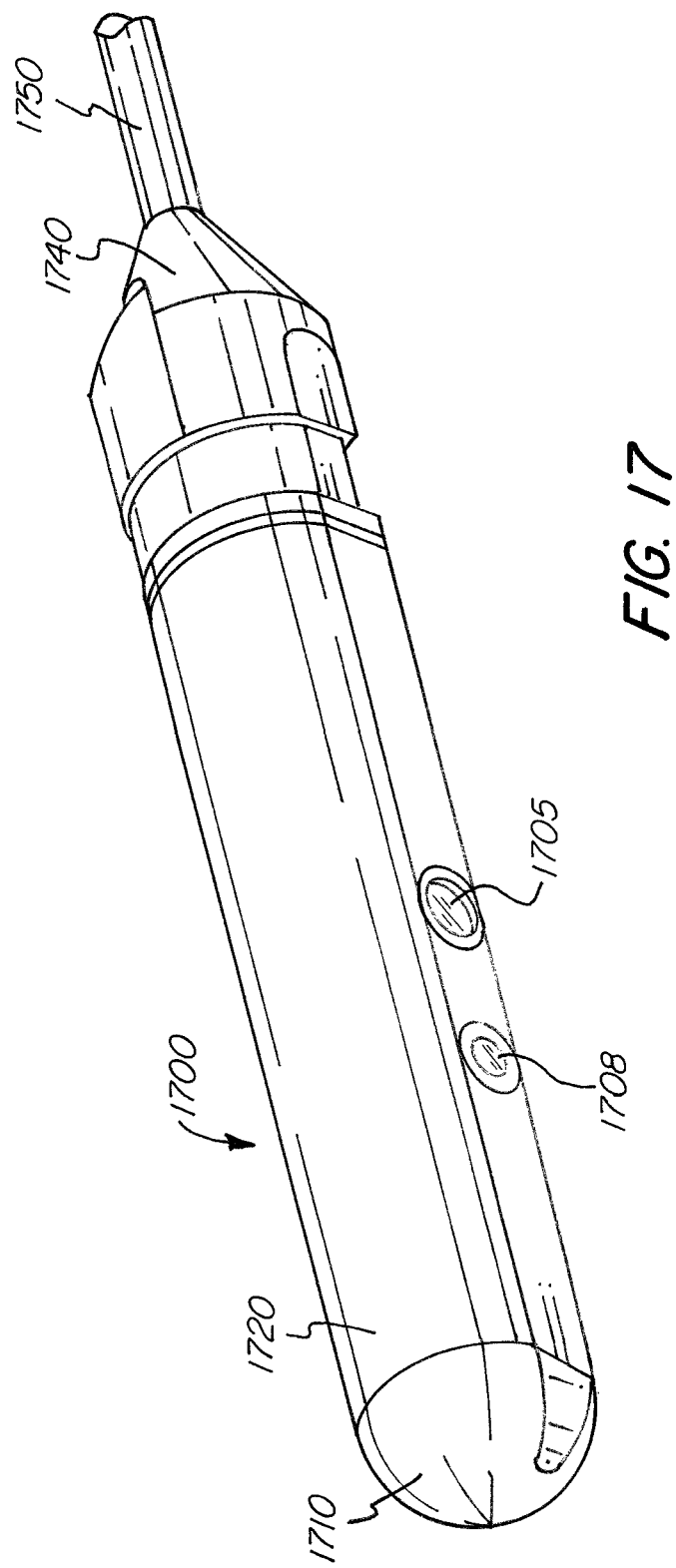
FIG. 17 is a perspective view of an endoscope of the present invention.

FIG. 17 depicts a deployable endoscopic imaging module 1700 of an embodiment of the present invention. FIG. 17 depicts endoscopic imaging module 1700 having a housing 1720 with a distal tip/end 1710 and a proximal end 1740.

The housing 1700 has a longitudinal axis extending from the proximal end 1740 to the distal end 1710 of the deployable endoscopic imaging module 1700. In the housing 1720, a camera, sensor, and/or imager is disposed within the housing 1720. In one embodiment, cable 1750 is shown and provides power and control to, and receives imaging and control data from, the deployable endoscopic imaging module 1700. The housing 1720 has illumination lens cover 1705 and imager lens cover 1708 allowing for the housing 1720 to be a hermetically sealed window assembly. The distal tip/end 1710 is used for easy insertion into an orifice of the body, and/or percutaneously via a trocar.

The illumination lens cover 1705 and imager lens cover 1708 allow for a light source and imager to shine from the bottom of the housing of the endoscope.

Figure 18:
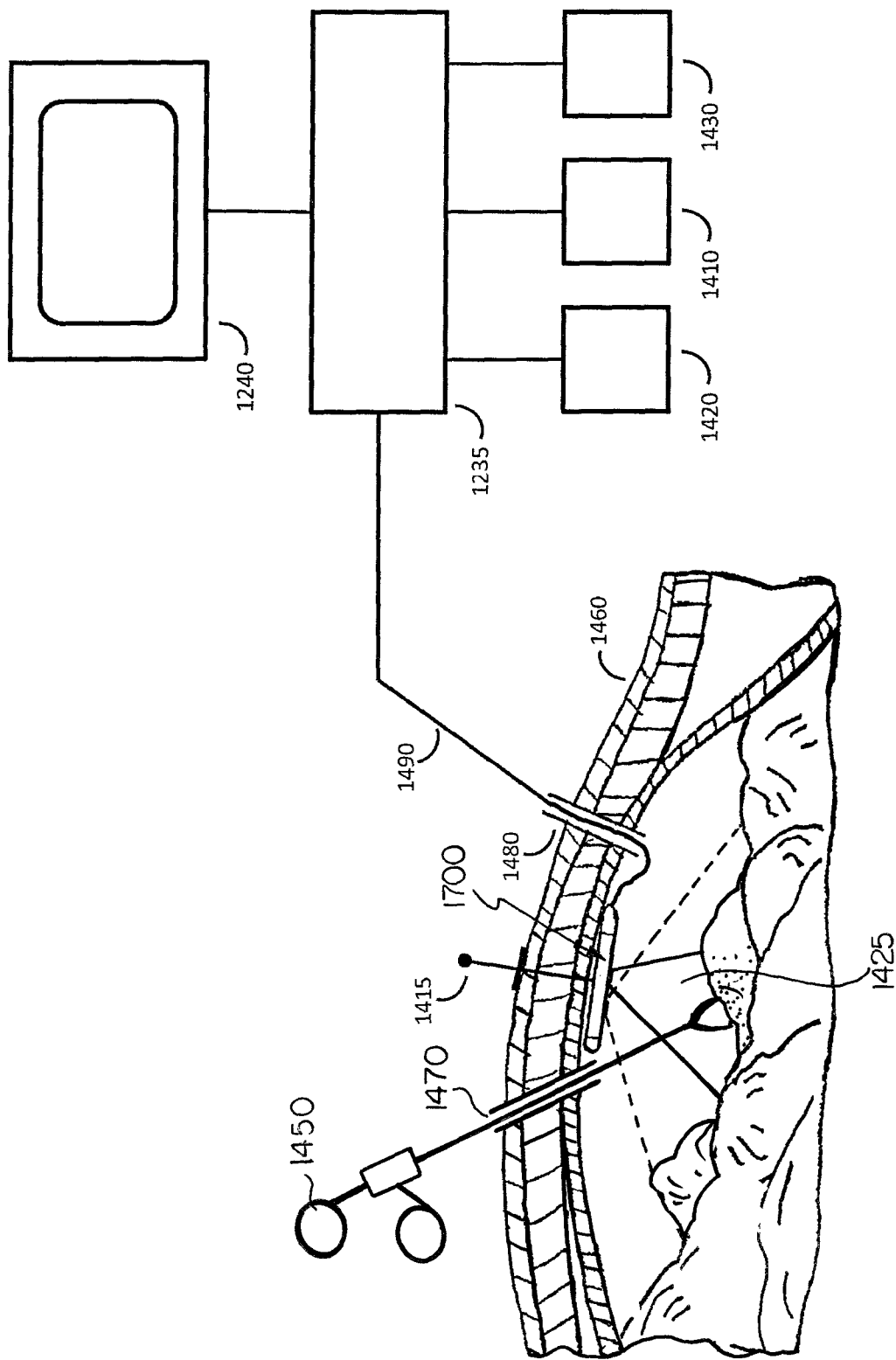
FIG. 18 is a view of the endoscope of FIG. 17 being deployed in a patient.

FIG. 18 shows a view of the endoscopic imaging system of an embodiment of the invention where the endoscopic imaging module 1700 is shown inserted (i.e. in vivo/in situ) through the skin 1460 of a patient. In FIG. 18, the endoscopic imaging module 100 is shown being able to pass through trocar 1480, which has an inner diameter of approximately less than 15 mm. The endoscopic imaging module 100 is shown connected via cable 1490 to a CCU 1235, which may be controlled by one or more input devices, including, but not limited to a keypad 1420, a joystick 1410, a foot pedal 1430, a button, a touchpad, a touchscreen, gesture detection, and/or voice control (not shown). These types of input devices may control the SS-VDOV view vectors of the deployable endoscopic imaging module 1700. The CCU 1235 outputs processed image data for presentation on the surgical display 1240. An endoscopic surgical instrument 1450 may be used by insertion through the patient's skin 1460 and into the abdominal cavity for therapeutic intervention within the endoscopic imaging module's 1700 selected field of view 1425. The dashed lines of FIG. 18 represent the field of view 1425 captured by the image sensor.

Figure 19:
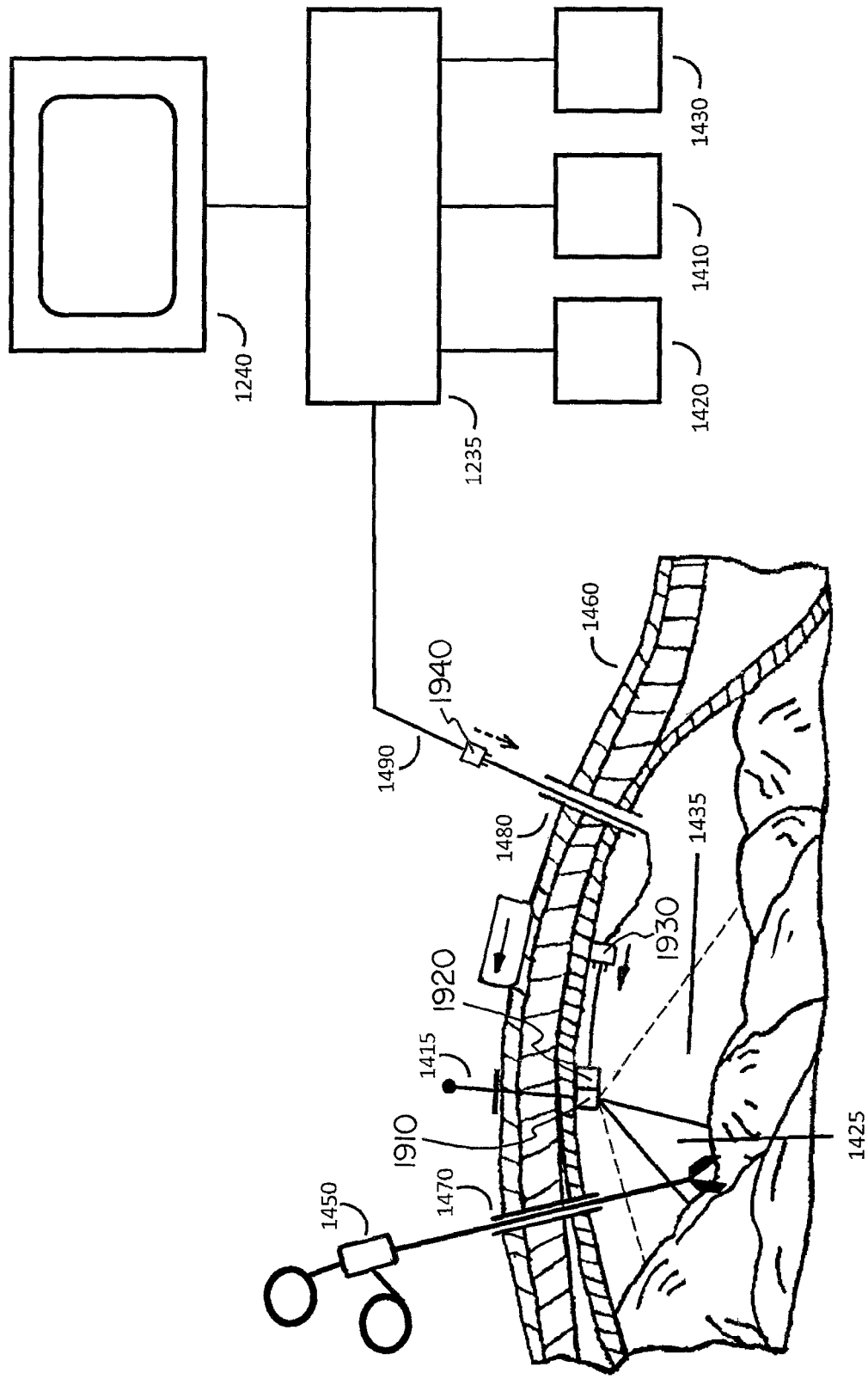
FIG. 19 is a view of an endoscope of the present invention being deployed in a patient.

FIG. 19 shows a view of the endoscopic imaging system of an embodiment of the invention where the endoscopic imaging module 1910/1920/1930/1940 is shown inserted (i.e. in vivo/in situ) through the skin 1460 of a patient. In FIG. 19, the endoscopic imaging module 1910/1920/1930/1940 is shown being able to pass through trocar 1480, which has an inner diameter of approximately less than 15 mm. The endoscopic imaging module 1910/1920/1930/1940 is shown connected via cable 1490 to a CCU 1235, which may be controlled by one or more input devices, including, but not limited to a keypad 1420, a joystick 1410, a foot pedal 1430, a button, a touchpad, a touchscreen, gesture detection, and/or voice control (not shown). These types of input devices may control the SS-VDOV view vectors of the deployable endoscopic imaging module 1700. The CCU 1235 outputs processed image data for presentation on the surgical display 1240. An endoscopic surgical instrument 1450 may be used by insertion through the patient's skin 1460 and into the abdominal cavity for therapeutic intervention within the endoscopic imaging module's 1910/1920/1930/1940 selected field of view 1425. The dashed lines of FIG. 19 represent the field of view 1435 captured by the image sensor.

The endoscopic imaging module is shown in four pieces 1910, 1920, 1930 and 1940. These pieces may be separate pieces and may be connected to one another via various means. The pieces 1910, 1920, 1930 and 1940 are shown passing through trocar 1480.

In certain embodiments, there may be a greater or smaller number of pieces that comprise the endoscopic imaging module than is shown in FIG. 19.

While the invention has been specifically described in connection with certain specific embodiments thereof, it is to be understood that this is by way of illustration and not of limitation, and that various changes and modifications in form and details may be made thereto, and the scope of the appended claims should be construed as broadly as the prior art will permit.

The description of the invention is merely exemplary in nature, and, thus, variations that do not depart from the gist of the invention are intended to be within the scope of the invention. Such variations are not to be regarded as a departure from the spirit and scope of the invention.

What is claimed is:

1. An endoscopic imaging system for performing surgery through a patient's skin, the endoscopic imaging system, comprising:
   an endoscopic imaging module configured to be located within the patient and configured to be manipulated through direct contact force and magnetic force, the endoscopic imaging module having a housing, a light source located within the housing, a camera located within the housing, a wide-angle lens located within the housing, a first magnet located within the housing, and a solid state imager located within the housing, the housing covered by a hermetic sleeve that at least partially forms a hermetic barrier to protect the housing and components disposed therein from operational environments;
   a second magnet configured to deploy the endoscopic imaging module to a position relative to the patient's skin and maintain the endoscopic imaging module in the position, the position remotely located relative to an opening in the patient's skin through which the endoscopic imaging module is inserted;
   an interface module;
   a first coupler connecting the endoscopic imaging module to the interface module;
   a display, to display images from the endoscopic imaging module, the display configured to be located outside the patient;
   a second coupler connecting the interface module to the display;
   a computer including software to process the images from the endoscopic imaging system to create a field of view; and
   an input that allows a user to select a portion of said field of view corresponding to a region of interest of said field of view during the surgery through the patient's skin.

2. The endoscopic system of claim 1, wherein the solid state imager captures a field of view.

3. The endoscopic system of claim 1, wherein the input is a button, joystick, touchpad, touchscreen, and/or foot pedal.

4. The endoscopic system of claim 1, wherein the endoscopic imaging module is a percutaneous system.

5. The endoscopic system of claim 1, wherein the input is gesture detection, and/or voice control.

6. The endoscopic system of claim 1, wherein the endoscopic imaging module is modular.

* * * * *